March 23, 1965 P. H. COOPER 3,174,607
MATERIAL FLOW DIVERTOR APPARATUS
Filed Oct. 29, 1962 2 Sheets-Sheet 1

INVENTOR:
PAUL H. COOPER
BY
Howson & Howson
ATTYS.

March 23, 1965 P. H. COOPER 3,174,607
MATERIAL FLOW DIVERTOR APPARATUS
Filed Oct. 29, 1962 2 Sheets-Sheet 2

INVENTOR:
PAUL H. COOPER
BY Howson & Howson
ATTYS.

United States Patent Office 3,174,607
Patented Mar. 23, 1965

3,174,607
MATERIAL FLOW DIVERTOR APPARATUS
Paul H. Cooper, Bangor, Pa., assignor to Penn Bangor, Inc., Bangor, Pa., a corporation of Pennsylvania
Filed Oct. 29, 1962, Ser. No. 233,829
8 Claims. (Cl. 193—23)

This invention relates to material flow divertor or flow route selector apparatus for selectively directing the flow of fluent material to any one of a plurality of receiving openings (for pipes, tanks, bins or the like) and has for an object the provision of improvements in this art.

One of the objects of the invention is to provide a divertor or selector which is arranged to be held in a stable position at any one of a plurality of openings or stations to which it is turned.

Another object is to provide a close fitting connection between the divertor spout and the receiving opening when the parts are brought together for the delivery of material whereby to guard against escape of material and dust at the joint.

The above and other objects of the invention as well as various features of novelty and advantages will be apparent from the following description of an exemplary embodiment, reference being made to the accompanying drawings thereof, wherein.

Figure 7:
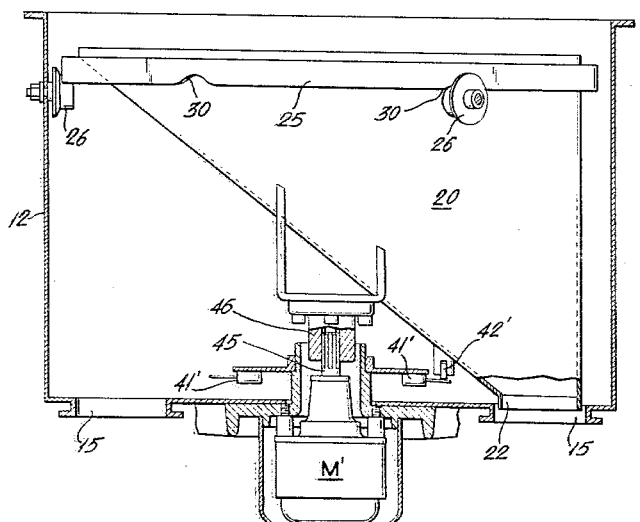

FIG. 7 s a partial elevation and section showing a modified drive arrangement.

As shown in the drawings, an elevator 10 delivers fluent material, such as grain or granular material (or even liquid) from an overhead supply source (not shown) where it has been raised by elevator means or otherwise, into a divertor or selector unit, which is generally denoted by the numeral 11, and which selectively feeds the material to any one of a plurality of receiving means as desired.

The divertor unit includes a cylinder shaped casing 12 supported at any desired height by means carried by a frame support or elevator leg 13.

The casing 12 has a bottom 14 provided with a plurality of material receiving delivery spouts or pipes 15 (here six) having top openings 16 adapted to receive material from above.

Rotatably mounted inside the casing is a divertor or selector device 20 of funnel-like shape with a top opening 21 which is almost as large as the cross section of the casing and a spout 22 on one side which is of a size to cooperate with an opening 16 in the bottom of the casing at any one of the spouts 15.

The divertor device 20 is carried by an annular track 25 secured thereto which rides upon a plurality of rollers or wheels 26 mounted in the casing.

The track 25 is provided with a plurality of bottom notches 30 adapted to rest on the rollers 26 when the spout 22 of the divertor device registers with one of the receiving openings 16. In the present case where there are six receiving openings and three supporting wheels there are six positioning and seating notches in the track.

When the notches drop down on the supporting rollers there is assurance that the spout of the divertor device is properly located at a receiving opening and this also causes the spout to be lowered down into the opening. If desired, a flange which closely fits between the joint parts may be provided either on the spout or around the opening or both. And if flexible and elastic it could fit more closely.

Figure 1:
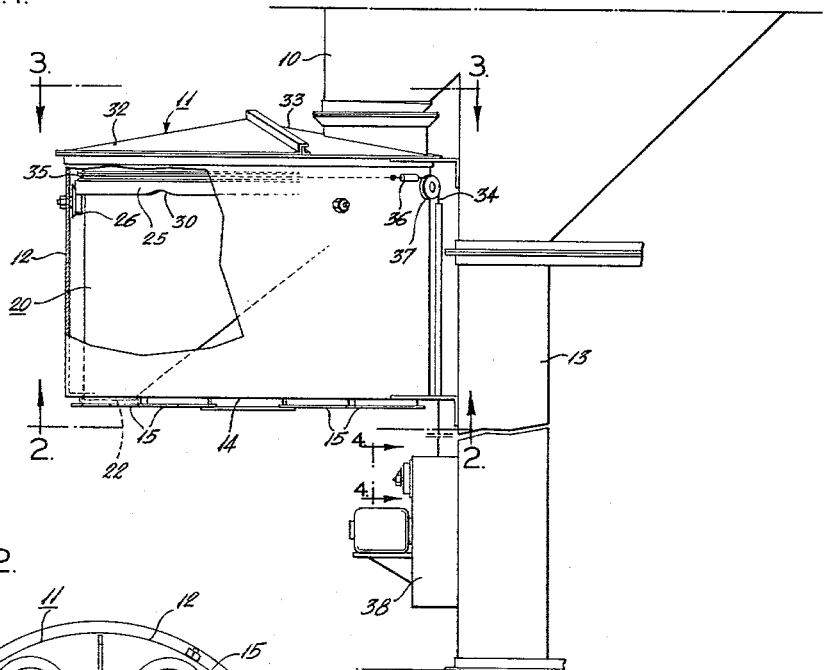
FIG. 1 is a side elevation, with parts broken away, of apparatus embodying the invention.
Figure 2:
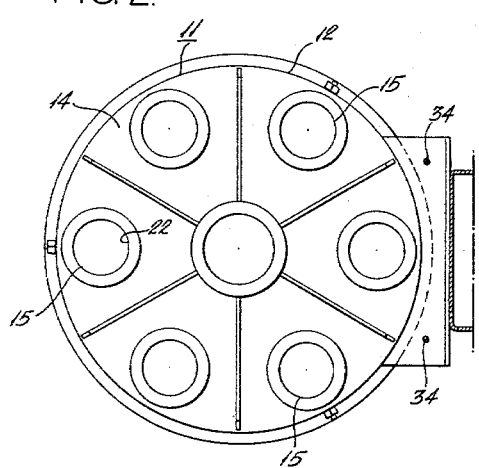
FIG. 2 is a bottom plan view taken on the line 2—2 of FIG. 1.
Figure 4:
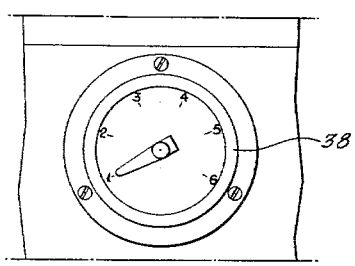
FIG. 4 is a front elevation of a control device, the view being taken on the line 4—4 of FIG. 1.
Figure 3:
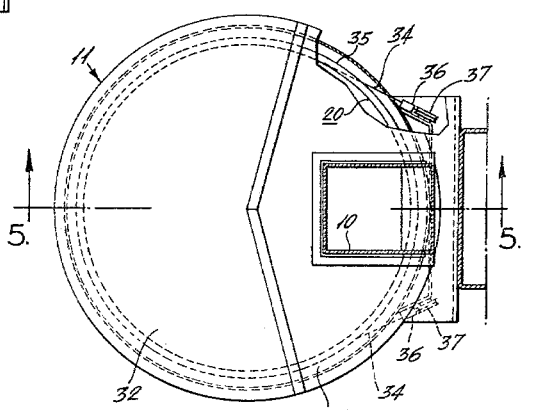
FIG. 3 is a top plan view taken on the line 3—3 of FIG. 1.
Figure 5:
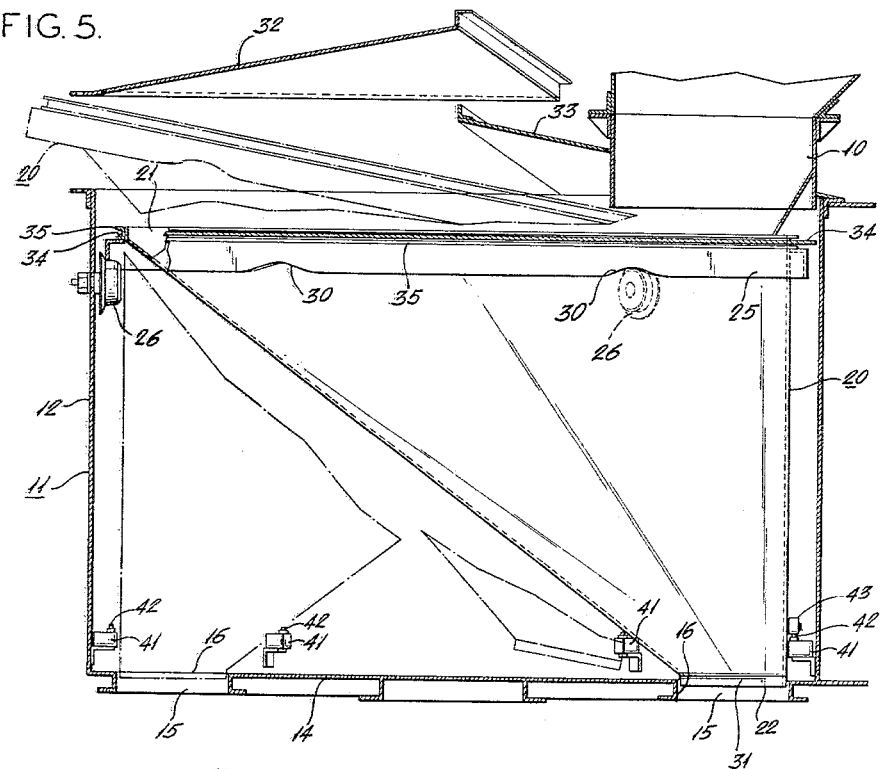
FIG. 5 is an enlarged vertical section taken on the line 5—5 of FIG. 3 with the cover removed and showing the divertor in operative position in solid lines and partly removed in broken lines.

The divertor device is of such shape and size and is so located and mounted that it can easily be removed through the top of the casing (as shown in FIG. 5), a cover 32 being mounted to swing up and out from a removable cover portion 33 at the spout 10.

Means are provided for turning the divertor device 20 on its axis to bring its spout 22 to the opening desired, the means here shown comprising a flexible belt or cable 34 wrapped around a grooved pulley element 35 of the divertor device and passing outward through tubular guides 36 to sheaves 37 mounted on the outside of the casing, thence downward to any suitable operating means 38, manual or motor, at a location convenient for access on the floor. The cable is preferably provided with a quickly-disconnectible joint so as to be easily removable to allow the divertor device to be removed.

The cable controlled divertor device may be turned back and forth to reach the various positions or if directly connected to motive means it may be turned consistently in one direction. If motor driven, the one-way drive avoids the use of a reversing switch or switches.

Figure 6:
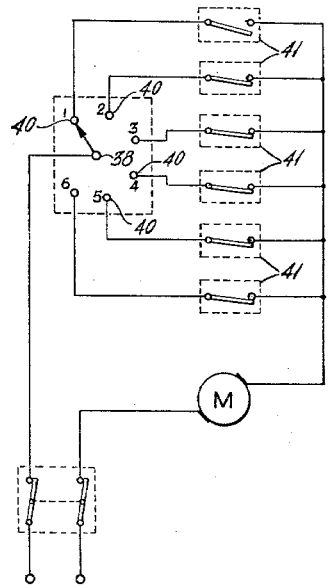
FIG. 6 is a wiring diagram.

A simple control circuit for a motorized turn and selector installation is shown in FIG. 6. Here the manual operating control means 38 comprises selector start switches 40 (actually contacts for the one switch arm), one for each position, and stop switches 41 in series respectively with the start switches 40, the stop switches 41 being located at the respective spout opening positions and having an operating element or plunger 42 adapted to be operated by a member 43 secured on the divertor device at its spout 22 so as to operate the switch when the notches in the track of the divertor device drop down on the rollers.

A motor M for turning the divertor device is arranged to be operated when two switches 40 and 41 in any line are closed and the motor will continue to operate until the spout of the divertor device arrives at the selected opening and drops down in a position to have the member 43 open the switch 41 at the selected opening.

When a shift of the spout to any other opening is desired, the manual selector 38 is turned to the indicated position on the dial provided to close the start switch 40 of the selected line and, since all stop switches 41 are closed except the one at the currently active station, this will complete a new operating line to the motor which will turn the divertor device until the spout is located at the newly selected station to stop the turning. For simplicity of circuit and description, it has been assumed that the belt or cable is endless and turns the divertor consistently in one direction but by providing reversing limit switches the divertor may be reversed at the end of a turning range of about 355 degrees.

FIG. 7 shows a modified drive arrangement in which a motor M' has its shaft 45 separably splined to a shaft 46 of the divertor and in which the operating element 42' at the spout is adapted to actuate switches 41' at the stop positions. No drive cable is needed with the FIG. 7 arrangement, only the circuit lead wires needing to be carried to the remote hand selector switch control.

It is thus seen that the invention provides simple, reliable and convenient apparatus for diverting fluent downflowing material to any one of a plurality of delivery openings, for holding the parts securely at any connected position and for making a relatively tight joint connection at the selected delivery point.

While certain embodiments of the invention have been described for purposes of illustration it is to be understood that there may be various embodiments and modifications within the general scope of the invention.

I claim:

1. Material flow divertor apparatus, comprising in combination, a supply spout, a rotatable divertor device mounted to turn on a vertical axis and having a bottom spout on one side and a large receiving top opening for receiving material from said supply spout in any turned position of the divertor device, housing means providing a plurality of delivery openings for said divertor device spout, and support means for said divertor device comprising roller elements and an annular track element therefor, one of said supporting elements, rollers or track, being carried by said divertor device and the other being carried by the housing means, said track having cam elements at delivery opening positions of the divertor device spout to index the divertor device to stop with its spout at an opening and to move the spout toward the opening.

2. Material flow divertor apparatus as set forth in claim 1, in which the track element is secured to said divertor device and provided with indexing cam notches in its lower side and in which said supporting roller elements are carried by said housing means.

3. Material flow divertor apparatus as set forth in claim 2, in which said divertor device is mounted in the upper part of a casing having a movable cover, the divertor being removable through the top of the casing when the cover is removed.

4. Material flow divertor apparatus as set forth in claim 1, in which a drive belt or cable is provided for turning said divertor device to various selected positions.

5. Material flow divertor apparatus as set forth in claim 1, in which a drive belt or cable and drive means are provided for said divertor device together with control means for said drive means for stopping said divertor device at any selected position where a cam element is riding on a roller.

6. Material flow divertor apparatus as set forth in claim 1, which further includes drive means for said divertor device which is disconnectable to release said divertor device for removal by upward movement.

7. Material flow divertor apparatus as set forth in claim 1, in which said supply spout is located at a distance to one side from the axis of said divertor device and which further includes drive means for said divertor device which is disconnectable to release said divertor device by upward and tilting movement.

8. Material flow divertor apparatus as set forth in claim 1, in which drive means are provided for said divertor device together with control means therefor for stopping said divertor device at any selected position where a cam element is riding on a roller with the divertor spout at one of said delivery openings.

References Cited by the Examiner

UNITED STATES PATENTS

| | | | |
|---|---|---|---|
| 1,004,053 | 9/11 | Madgett | 141—392 XR |
| 1,911,579 | 5/33 | McNeil | 141—387 XR |
| 2,619,272 | 11/52 | Boehling | 141—248 XR |

LAVERNE D. GEIGER, *Primary Examiner.*